(12) United States Patent
El Kallassi (10) Patent No.: US 10,831,320 B2
(45) Date of Patent: Nov. 10, 2020

(54) SELF-REFERENCED CAPACITIVE FORCE SENSOR

(71) Applicant: Synaptics Incorporated, San Jose, CA (US)

(72) Inventor: Pascale El Kallassi, Menlo Park, CA (US)

(73) Assignee: Synaptics Incorporated, San Jose, CA (US)

( * ) Notice: Subject to any disclaimer, the term of this patent is extended or adjusted under 35 U.S.C. 154(b) by 61 days.

(21) Appl. No.: 15/899,777

(22) Filed: Feb. 20, 2018

(65) Prior Publication Data

US 2019/0163297 A1 May 30, 2019

Related U.S. Application Data

(60) Provisional application No. 62/593,174, filed on Nov. 30, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0445* (2019.05); *G06F 3/0447* (2019.05); *G06F 3/0412* (2013.01); *G06F 3/04144* (2019.05); *G06F 2203/04105* (2013.01)

(58) Field of Classification Search
CPC ...... G06F 3/044; G06F 3/0416; G06F 3/0447; G06F 3/0445; G06F 3/0412; G06F 2203/04105; G06F 3/04144
See application file for complete search history.

(56) References Cited

U.S. PATENT DOCUMENTS

| | | | | |
|---|---|---|---|---|
| 5,323,650 | A * | 6/1994 | Fullen | A61B 5/1036 340/573.1 |
| 6,159,761 | A | 12/2000 | Okada | |
| 9,690,413 | B2 | 6/2017 | Filiz et al. | |
| 2004/0156168 | A1* | 8/2004 | Levasseur | G06F 3/0414 361/679.21 |
| 2010/0253645 | A1 | 10/2010 | Bolender | |
| 2012/0127112 | A1* | 5/2012 | Lu | G06F 3/044 345/174 |

(Continued)

OTHER PUBLICATIONS

International Search Report and Written Opinion for PCT Application No. PCT/US2018/024135, dated Aug. 27, 2018, 16 pages.

*Primary Examiner* — Patrick N Edouard
*Assistant Examiner* — Joseph P Fox
(74) *Attorney, Agent, or Firm* — Paradice & Li LLP (57) ABSTRACT

A force sensing apparatus includes a first layer having a first electrode disposed thereon, a second layer having a second electrode disposed thereon, and a spacer layer configured to transfer an input force exerted on the first layer to the second layer. The spacer layer causes a change in a separation distance between the first electrode and the second electrode in response to the input force. The force sensing apparatus further includes processing circuitry to detect a change in capacitive coupling between the first electrode and the second electrode based on the change in separation distance, and to determine force information about the input force based at least in part on the detected change in capacitive coupling.

20 Claims, 8 Drawing Sheets

(56) References Cited

U.S. PATENT DOCUMENTS

| | | |
|---|---|---|
| 2012/0274599 A1 | 11/2012 | Schediwy |
| 2015/0363019 A1* | 12/2015 | Schediwy ............... G06F 3/044 345/174 |
| 2015/0378496 A1* | 12/2015 | Vandermeijden ..... G06F 3/0416 345/174 |
| 2016/0062500 A1 | 3/2016 | Kessler et al. |
| 2017/0024047 A1* | 1/2017 | Kung ................... G06F 3/0414 |

* cited by examiner

SELF-REFERENCED CAPACITIVE FORCE SENSOR

CROSS-REFERENCE TO RELATED APPLICATION

This application claims priority and benefit under 35 USC § 119(e) to U.S. Provisional Patent Application No. 62/593,174, filed on Nov. 30, 2017, which is incorporated herein by reference in its entirety.

TECHNICAL FIELD

The present embodiments relate generally to force sensing, and specifically to a self-referenced capacitive force sensor.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by an input surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices also have the ability to detect forces applied to the input surface in addition to determining positional information for input objects interacting with a sensing region of the input surface. For example, one or more force sensors coupled to the input surface may detect the amount of force exerted on the input surface based, at least in part, on a movement or deflection of the input surface under the applied force. In the past, capacitive force sensors have sometimes relied on a midframe or other layer of a display device to provide a fixed point of reference by which to measure the deflection of the input surface. For example, the underside of the input surface may include a first set of electrodes that are conductively paired with a second set of electrodes provided on the device midframe. The deflection of the input surface may affect the capacitive coupling of the first set of electrodes and the second set of electrodes (e.g., based on the degree of separation between the electrodes). Accordingly, the force sensor may correlate the measured capacitance (or change in capacitance) between the first set of electrodes and the second set of electrodes with an amount of force exerted on the input surface.

Because conventional force sensors require sensor electrodes to be placed on the midframe or other structural component of the display device, the effectiveness of the force sensors may be highly sensitive to the construction of the device and/or manufacturing tolerances. Thus, it is desirable to provide a self-referenced capacitive force sensor that can be manufactured and integrated into the display as a single self-contained unit.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A self-referenced force sensing apparatus is disclosed. The force sensing apparatus includes a first layer having a first electrode disposed thereon, a second layer having a second electrode disposed thereon, and a spacer layer configured to transfer an input force exerted on the first layer to the second layer. The spacer layer causes a change in a separation distance between the first electrode and the second electrode in response to the input force. The force sensing apparatus further includes processing circuitry to detect a change in capacitive coupling between the first electrode and the second electrode based on the change in separation distance, and to determine force information about the input force based at least in part on the detected change in capacitive coupling.

The input force may cause a displacement of the first electrode and the second electrode. In some implementations, the spacer layer may be configured to cause a deflection of the second electrode relative to the first electrode in response to the input force. For example, the deflection may cause an increase in the separation distance between the first electrode and the second electrode. In some aspects, the spacer layer may be configured to maintain a threshold separation distance between the first layer and the second layer when no external forces are applied to the first layer.

In some implementations, the second layer may be partitioned into a plurality of sections. For example, each of the plurality of sections may include a respective electrode disposed thereon. The spacer layer may be configured to transfer the input force to one or more of the plurality of sections of the second layer by causing a deflection of the one or more sections relative to the first layer. In some aspects, the processing circuitry may be further configured to determine position information about the input force based at least in part on a relative location of the one or more sections in the second layer.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

Figure 1:
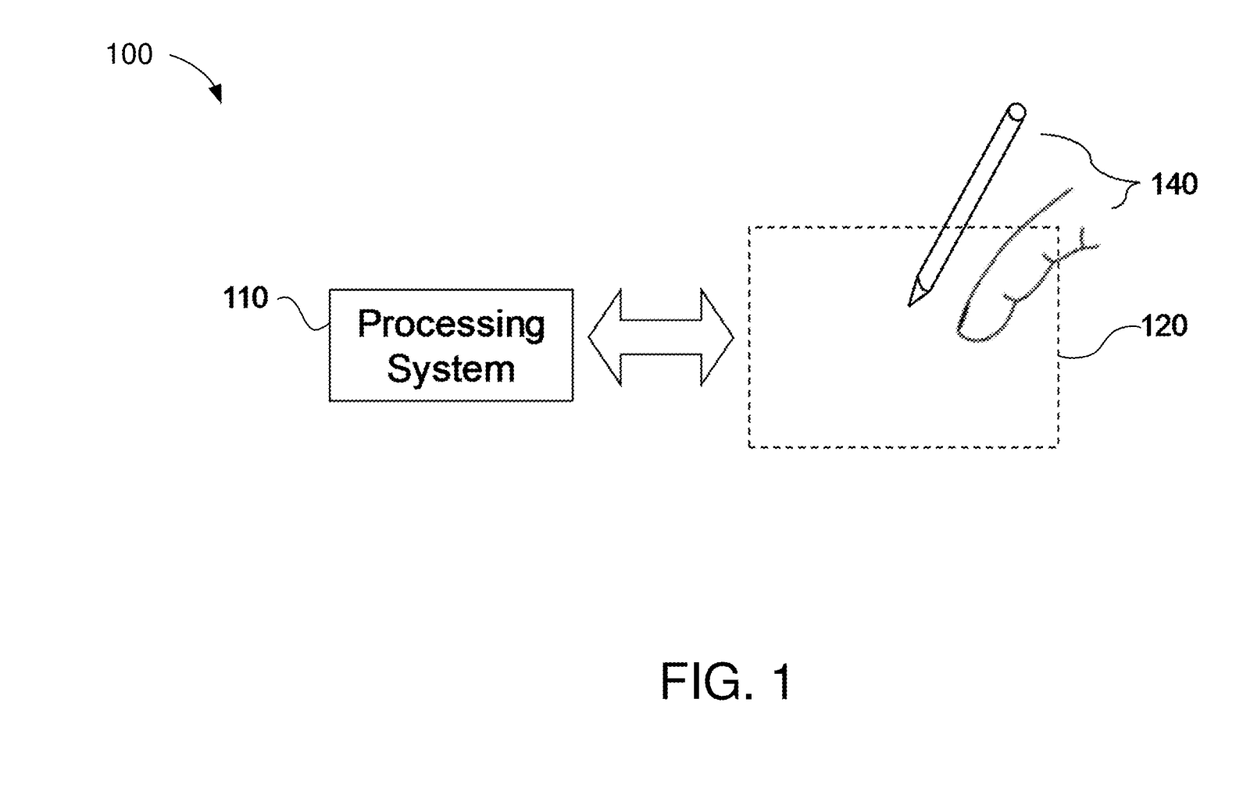
FIG. 1 shows an example input device within which the present embodiments may be implemented.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, resistive, inductive, magnetic, acoustic, ultrasonic, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

In some embodiments, the input device 100 may further detect a force exerted on an input surface coinciding with the sensing region 120. For example, the input device 100 may include one or more force sensors configured to generate force information representative of the force exerted by the input object 140 when making contact with the sensing region 120. The force information may be in the form of electrical signals representative of an amplitude (or change in amplitude) of the force applied to the input surface. For example, the force sensors may be formed, at least in part, by multiple layers of conductors provided on an underside of the input surface. The input surface may be configured to move (e.g., deflect and/or compress) when a force is applied the input object 140. The movement of the input surface may cause a change in displacement between the conductors of the force sensor. The force sensors may produce electrical signals based on a change in capacitance between the conductors (e.g., as a result of the change in displacement) when the input surface deforms. Thus, the change in capacitance may correlate with the amount of force exerted on the input surface.

The processing system 110 may be configured to operate the hardware of the input device 100 to detect input in the sensing region 120. In some embodiments, the processing system 110 may control one or more sensor electrodes and/or force sensors to detect objects in the sensing region 120. For example, the processing system 110 may be configured to transmit signals via one or more transmitter sensor electrodes and receive signals via one or more receiver sensor electrodes. The processing system 110 may also be configured to receive force information via one or more force sensors. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the processing system 110 may further determine positional information and/or force information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. Likewise, the term "force information," as used herein, refers to any information describing or otherwise indicating a force exerted by an input object in contact with a touch surface of the input device 100. For example, the force information may be provided as a vector or scalar quantity (e.g., indicating a direction and/or amplitude). As another example, the force information may include a time history component and/or describe whether the force exerted by the input object exceeds a threshold amount.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, the processing system 110 may detect a force exerted by the input object 140 in the sensing region 120 (e.g., an "input force") based on changes in an electric field (or capacitance) provided by corresponding force sensors. More specifically, the processing system 110 may continuously (or periodically) detect the capacitance of a force sensor and compare the detected capacitance against a baseline capacitance level (e.g., corresponding to a state of the force sensor when no external force is exerted on the input surface). The processing system 110 may sense an input force if the capacitance detected across one or more force sensors differs from their respective baselines by a threshold amount.

Since the capacitance across a pair of conductors varies with respect to the distance of separation between the conductors, the construction of the force sensor should ensure that forces exerted on the input surface cause a change in the separation distance between a pair of force sensing conductors. In the past, capacitive force sensing apparatuses have used the midframe or other structural member of a corresponding device (e.g., mobile phone) as a fixed point of reference by which to measure the deflection of the input surface. However, as noted above, the placement of force sensing conductors on the midframe of a device may case the force sensor apparatus to be highly sensitive to the construction of the underlying device and/or manufacturing tolerances.

In some embodiments, the force sensors of the input device 100 may comprise one or more self-referenced capacitive force sensors. As used herein, the term "self-referenced" refers to a capability of the force sensor to use its own structure as a reference for detecting changes in capacitance (e.g., as opposed to a midframe or other component of the input device 100). For example, each force sensor may include a pair of electrodes (e.g., conductors) provided on respective layers of the force sensor. The electrodes may be separated by a separation distance (D) when operating in a quiescent state (e.g., when no external forces are exerted on the input surface). Forces applied to the input surface may cause a change in the separation distance (Δd) between the electrodes, resulting in a corresponding change in capacitance. In example embodiments, rather than rely on the device midframe as a fixed point of reference for force sensing, each layer of the self-referenced force sensor may be coupled to the underside of the input surface. Thus, at least one of the electrodes may bend and/or deflect in response to forces exerted on the input surface. However, the embodiments described herein may ensure that the movement of one of the electrodes is different than the movement of the other electrode so that a relative change in the separation distance Δd between the electrodes can be detected (e.g., and a corresponding change in capacitance can be measured).

Among other advantages, aspects of the present disclosure allow for a self-referenced force sensing apparatus that can be manufactured and integrated into the input device 100 as a self-contained unit or apparatus. For example, because the self-referenced force sensors do not depend on the placement of conductors or electrodes on the midframe (or other structural components) of the input device 100, the force sensors of the present embodiments may be manufactured, tested, and calibrated independently of other components of the input device 100. As a self-contained unit, integrating the self-referenced force sensing apparatus into the input device 100 may have little or no effect on the design and/or placement of other components of the input device 100, thus offering greater flexibility in the overall design and/or configuration of the input device 100.

Figure 2A:
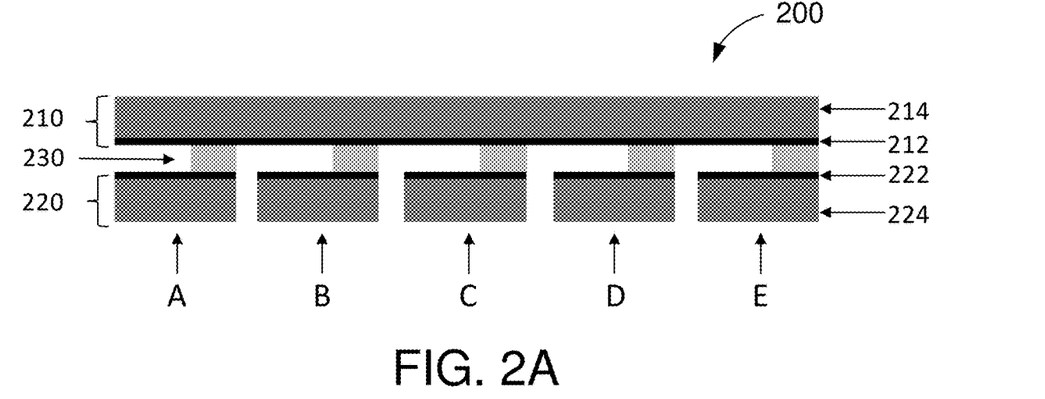
FIGS. 2A-2C show block diagrams depicting cross-sections of a self-referenced force sensor, in accordance with some embodiments.

FIG. 2A shows a block diagram depicting a cross-section of a self-referenced force sensor 200, in accordance with some embodiments. The force sensor 200 may be an example embodiment of a force sensor provided in the input device 100 of FIG. 1. Specifically, the force sensor 200 includes an upper layer 210, a lower layer 220, and a spacer layer 230.

The upper layer 210 may comprise a substrate 214 and one or more electrodes 212. Similarly, the lower layer 220 may comprise a substrate 224 and one or more electrodes 222. For example, each of the substrates 214 and/or 224 may be formed from a polyethylene terephthalate (PET), polycarbonate (PC), glass, polyimide, or other similar material. Each of the electrodes 212 may comprise conductors or conductive traces formed on the underside (or topside) of the substrate 214. Each of the electrodes 222 may comprise conductors or conductive traces formed on the topside (or underside) of the substrate 224. In some implementations, one or more of the substrates 214 and/or 224 may be formed from a conductive material (such as steel).

In some embodiments, the upper layer 210 may comprise one continuous (or contiguous) layer of substrate 214. However, the lower layer 220 may be partitioned into a plurality of sections or regions (A-E). The individual sections/regions A-E of the lower layer 220 may be referred to as respective force sensing "pixels" of the force sensor 200. Each of the force sensing pixels A-E may be coupled to the upper layer via a respective member of the spacer layer 230. For example, the spacer layer 230 may comprise an adhesive material that attaches to a small surface area on each force sensing pixel A-E of the lower layer 220. The spacer layer 230 may ensure a minimum or threshold separation distance (D) between the electrodes 212 and 222 (e.g., when the force sensor 200 is in a quiescent state), and may transfer a displacement of the upper layer 210 to the lower layer 220 when one or more external forces are exerted on a corresponding input surface (not shown for simplicity).

Figure 2B:
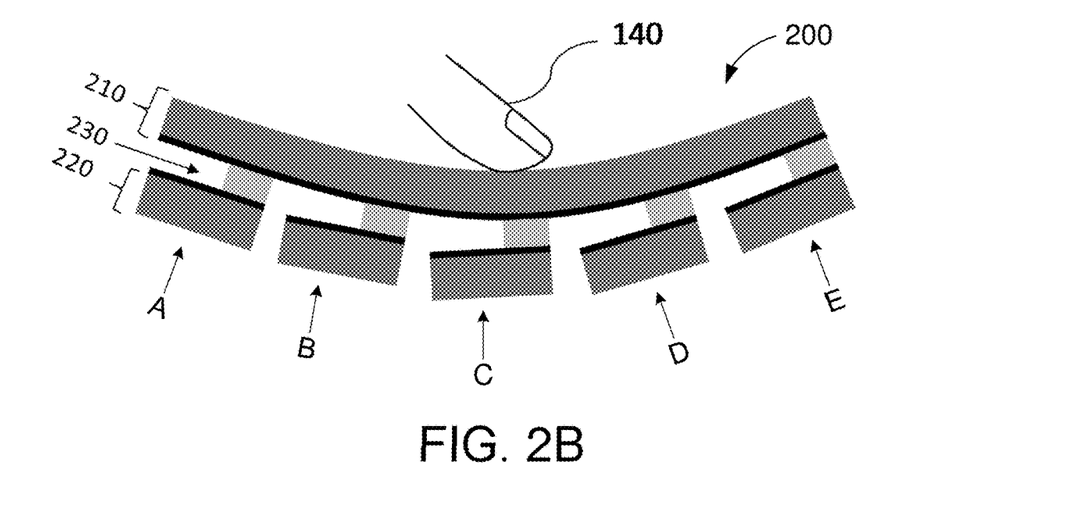
Figure 2C:
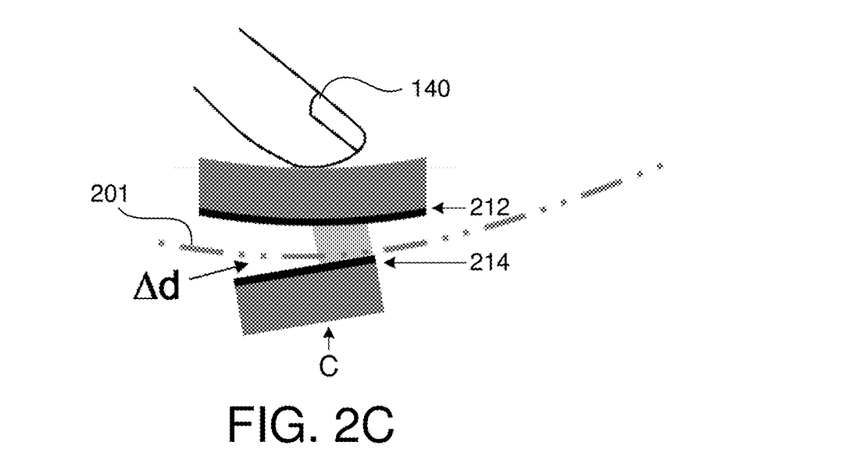

In some embodiments, the spacer layer 230 is configured to enable the force sensing pixels to remain tangent to the deflected lower layer 220, while moving away from the upper layer 210, when external forces are exerted on the input surface. For example, as shown in FIG. 2B, a force is exerted by an input object 140 at a location on the upper layer 210. In the example of FIG. 2B, the location of the force coincides with force sensing pixel C. The force exerted by the input object 140 causes both the upper layer 210 and the lower layer 220 to bend, while the spacer layer 230 maintains a tangential relationship between the force sensing pixels A-E and the bending of the lower layer 220. More specifically, as shown in FIG. 2C, the force exerted by the input object 140 causes a vertical displacement of the force sensing pixel C. However, because the force sensing pixel remains tangent to the curvature 201 (e.g., bend angle) of the lower layer 220, the movement of the force sensing pixel C causes a deflection of the electrode 222 relative to the electrode 212. The degree of deflection results in a corresponding change in the separation distance (Δd) between the electrodes 212 and 222.

The change in separation distance Δd may effect a change in capacitance across the electrodes 212 and 222. In some embodiments, the change in capacitance may be measured using transcapacitance sensing techniques. For example, the electrodes 212 (or 222) may be used as transmitter electrodes to transmit signals and/or generate electric fields, and the electrodes 222 (or 212) may be used as receiver electrodes to receive the transmitted signals and/or sense the electric fields. The change in capacitance across the electrodes 212 and 222 may be measured based on changes in the signals received by the receiver electrodes. For example, as the amount of force exerted by the input object 140 increases, the separation distance between the electrodes 212 and 222 may also increase (or decrease, depending on the location of the applied force). The increase (or decrease) in separation distance may result in a corresponding a decrease (or increase) in the measured capacitance across the electrodes 212 and 222.

In other embodiments, a change in capacitance may be measured using absolute capacitance sensing techniques. For example, the electrodes 222 (or 212) may be used as transmitter and receiver electrodes to detect changes in the capacitive coupling to the electrodes 212 (or 222). For example, the movement of the force sensing pixel C (e.g., caused by the force of the input object 140) may alter the electric field near the electrodes 222 (or 212), thus changing the measured capacitive coupling. Still further, in some embodiments, a change in capacitive coupling may detected between two or more electrodes disposed on the same layer. For example, in some aspects, the electrodes 212 (or 222) disposed on the first layer 210 (or second layer 220) may include a transmitter electrode and a receiver electrode. The movement of the force sensing pixel C may alter the capacitive coupling between the electrodes 212 (or 222) based on the proximity of one or more electrodes 222 (or 212) from the neighboring layer 220 (or 210). In some other aspects, one or more additional electrodes (not shown for simplicity) may be printed on the top side of substrate 214 and/or the underside of substrate 224. The movement of the force sensing pixel may alter the capacitive coupling between the electrodes disposed on either side of the same substrate (214 or 224) based on the proximity of one or more electrodes on the neighboring substrate (224 or 214).

It is noted that the force sensor 200 may be capable of detecting changes in the capacitive coupling of the force sensing pixels A-E (e.g., using transcapacitance or absolute capacitance sensing techniques) even if the force sensing pixels A-E deflect by a very small amount.

Figure 3:
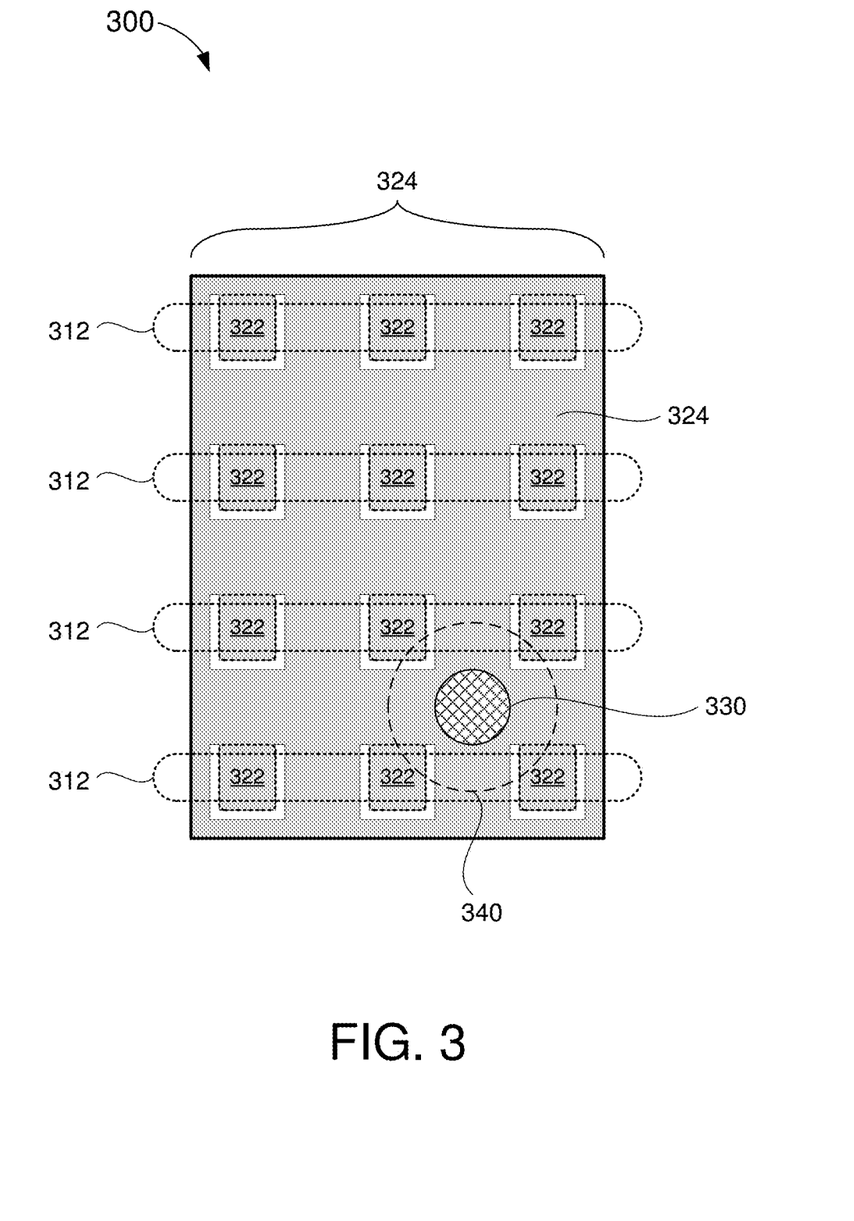
FIG. 3 shows an example sensor configuration underlying an input surface of an input device, in accordance with some embodiments.

FIG. 3 shows an example sensor configuration 300 underlying an input surface of an input device, in accordance with some embodiments. The sensor configuration 300 depicted in FIG. 3 may be an example embodiment of the force sensor 200 of FIGS. 2A-2C. The sensor configuration 300 includes a first set of electrodes 312, a second set of electrodes 322, and a substrate 324 underlying the second set of electrodes 322. For example, the first set of electrodes 312, the second set of electrodes 322, and the substrate 324 may correspond to electrodes 212, electrodes 222, and substrate 224, respectively, of FIGS. 2A-2C. The substrate 214 and spacer layer 230 are not shown, for simplicity, in FIG. 3.

In some embodiments, the substrate 324 may include a number of cut-outs upon which the electrodes 322 are formed. In the example of FIG. 3, the cut-outs are depicted to be rectangular in shape. However, in actual implementations, the cut-outs may be of various shapes and/or sizes. As described above, the cut-outs may allow the electrodes 322 to deflect (e.g., relative to the electrodes 312) when external forces are applied on a corresponding input surface (not shown for simplicity). In the example of FIG. 3, the electrodes 312 are disposed in a horizontal configuration such that each of the electrodes 312 overlaps a corresponding row of electrodes 322. However, in actual implementations, the electrodes 312 and/or 322 may be disposed in various other configurations. For example, in some aspects, the electrodes 312 may be disposed in a vertical configuration. In other aspects, the electrodes 312 and/or 322 may be individually addressed (e.g., not based on a row/column configuration).

As described above, each force sensor may be formed by the intersection of one of the first set of electrodes 312 and one of the second set of electrodes 322 (e.g., corresponding to a force sensing pixel). In some embodiments, the amount of force exerted on the input surface may be measured based on changes in the capacitive coupling of the sensor electrodes 312 and 322 (e.g., using transcapacitance and/or absolute capacitance sensing techniques). More specifically, forces exerted on the input surface may cause one or more of the electrodes 322 to deflect relative to a corresponding one of the electrodes 312, resulting in a change in capacitive coupling between the corresponding pair of electrodes 312 and 322. The change in capacitive coupling may then be correlated with an amount of force exerted on a particular region of the input surface.

Figure 4:
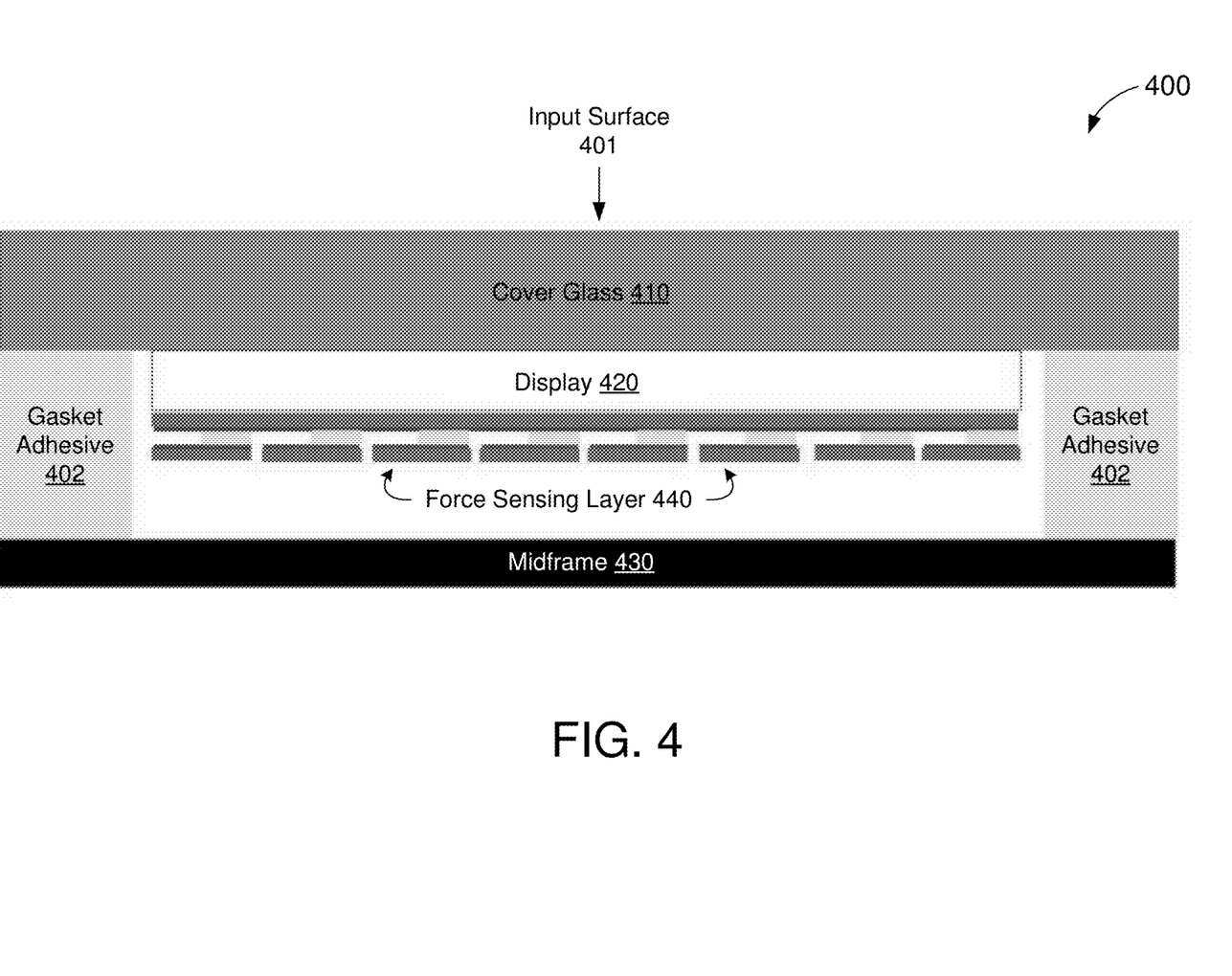
FIG. 4 shows a cross-sectional view of an input device with self-referenced force sensing capabilities, in accordance with some embodiments.

In some embodiments, the amount and/or location of the force sensing pixels may be configured such that localized forces exerted on the input surface may be distributed (e.g., through bending) across a wider area or region. For example, the force sensor 300 may be disposed beneath one or more layers of a corresponding input device (e.g., such as a cover glass and/or display as shown in FIG. 4). As a result, localized forces exerted on the input surface may be diffused and/or distributed across a wider area via the intervening layers of the input device or display. Thus, the arrangement and/or density of the force sensing pixels may ensure that at least one of the electrodes 322 may be actuated (e.g., deflected) when an input force is exerted at any location on the input surface.

In the example of FIG. 3, a highly localized force 330 may be exerted by an input object at the lower right region of the input surface. Although the actual input force 330 may be exerted at the region in between four surrounding force sensing pixels, the intervening layers of the input device may distribute the bending of one or more layers of the force sensor 300 (e.g., in response to the input force 330) across a wider area 340 that at least partially covers each of the surrounding force sensing pixels. As a result, the four electrodes 322 in the lower right corner of the sensor configuration 300 may deflect in response to the input force 330, thus causing respective changes in their capacitive couplings with the two electrodes 312 in the lower portion of the sensor configuration 300.

In some embodiments, a processing system (e.g., processing system 110 of FIG. 1) coupled to the sensor configuration 300 may determine position information about the input force based on a relative location of the force sensing pixels being actuated. For example, the processing system may detect corresponding changes in capacitance resulting from the deflection of the four electrodes 322 in the lower right corner of the sensor configuration 300. The processing system may then determine, based on the position of the actuated electrodes 322 and the detected change in capacitance, the location of the input force.

FIG. 4 shows a cross-sectional view of an input device 400 with self-referenced force sensing capabilities, in accordance with some embodiments. The input device 400 may be an example embodiment of the input device 100 of FIG. 1. The input device 400 includes a cover glass 410, a display 420, a midframe 430, and a force sensing layer 440. In some embodiments, the cover glass 410 may be mounted to the midframe via a gasket adhesive 402. At least part of the cover glass 410 and/or display 420 may provide an input surface 401 for the input device 400.

The force sensing layer 440 may be an example embodiment of the self-referenced force sensor 200 described above with respect to FIGS. 2A-2C. In the example of FIG. 4, the force sensing layer 440 may be coupled to the underside of the display 420 as an entirely self-contained unit. In some embodiments, forces applied to the input surface 401 may cause force sensing pixels in the force sensing layer 440 to deflect, resulting in a change in capacitance between electrode pairs in the force sensing layer 440 which can be measured and/or correlated with force information about the input force. Thus, the force sensing layer 440 does not depend on any circuitry or components on the midframe 430 (or elsewhere on the input device 400) to detect forces exerted on the input surface 401.

It is noted that electrostatic forces may cause the force sensing pixels to "stick" to the upper layer of the force sensing layer 440, thus preventing the movement/deflection of the pixels when a force is exerted on the input surface 401. Thus, in some embodiments, spacer dots may be printed on the upper layer of the force sensing layer 440 (e.g., coinciding with the locations of force sensing pixels) to prevent the force sensing pixels from sticking to the upper layer. This may ensure that forces exerted on the input surface 401 will cause a change in the displacement of one or more force sensing pixels relative to the upper layer of the force sensing layer 440, thus creating a measurable change in the capacitive coupling between a corresponding pair of electrodes.

Figure 5:
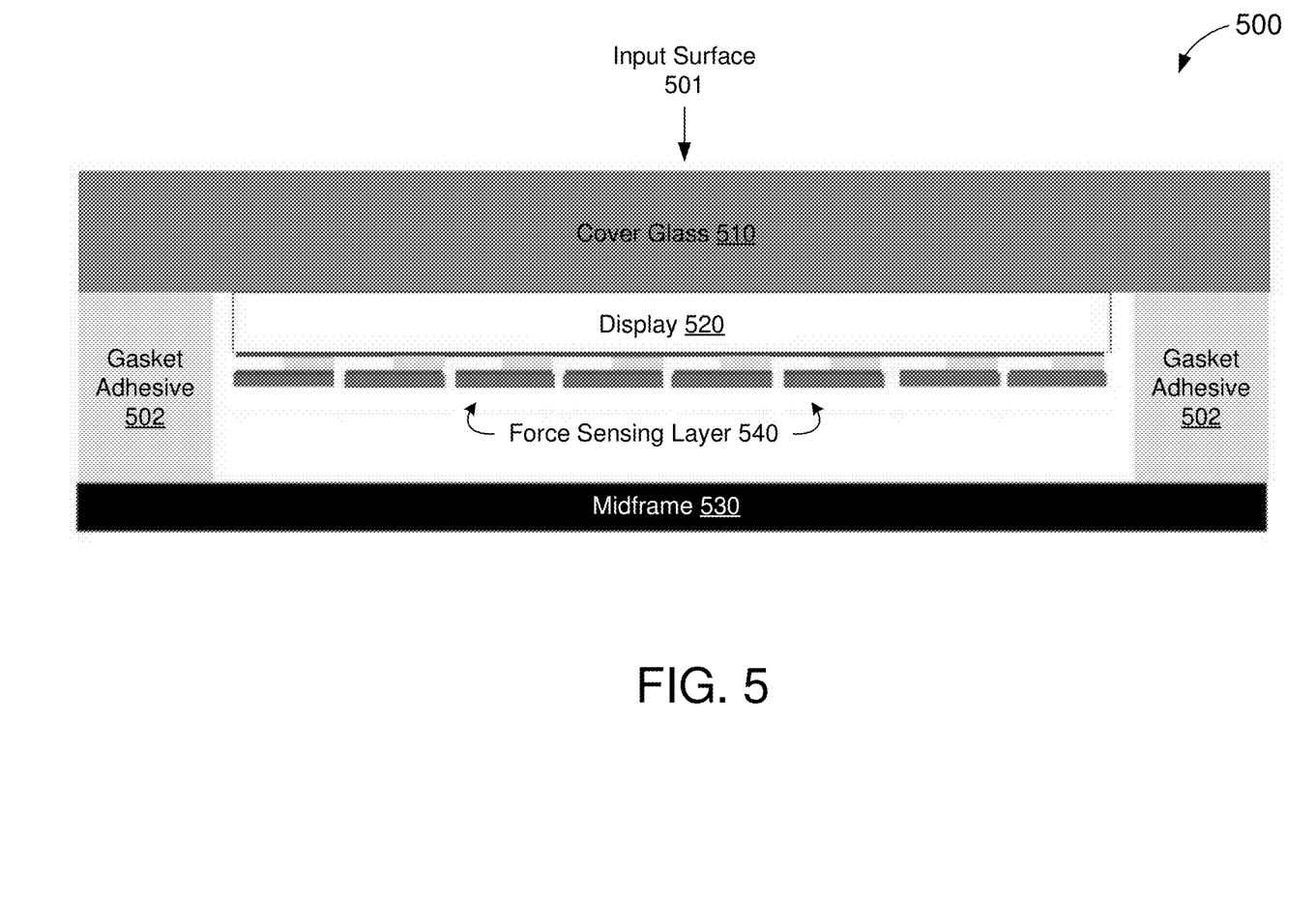
FIG. 5 shows a cross-sectional view of an input device with self-referenced force sensing capabilities, in accordance with some other embodiments.

FIG. 5 shows a cross-sectional view of an input device 500 with self-referenced force sensing capabilities, in accordance with some embodiments. The input device 500 may be an example embodiment of the input device 100 of FIG. 1. The input device 500 includes a cover glass 510, a display 520, a midframe 530, and a force sensing layer 540. In some embodiments, the cover glass 510 may be mounted to the midframe via a gasket adhesive 502. At least part of the cover glass 510 and/or display 520 may provide an input surface 501 for the input device 500.

The force sensing layer 540 may be an example embodiment of the self-referenced force sensor 200 described above with respect to FIGS. 2A-2C. In the example of FIG. 5, at least part of the force sensing layer 540 may be integrated with the display 520. For example, one or more electrodes of the force sensing layer 540 (such as the electrodes 212 of FIG. 2A) may be printed on one or more layers of the display 520 (such as the underside of the display 520). Thus, in some aspects, the force sensing layer 540 may leverage one or more components of the display 520 to detect forces on the input surface. In some embodiments, forces applied to the input surface 501 may cause force sensing pixels in the force sensing layer 540 to deflect, resulting in a change in capacitance between electrode pairs in the force sensing layer 540 which can be measured and/or correlated with force information about the input force.

It is noted that electrostatic forces may cause the force sensing pixels to stick to the bottom surface of the display 520, thus preventing the movement/deflection of the pixels when a force is exerted on the input surface 501. Thus, in some embodiments, spacer dots may be printed on the bottom surface of the display 520 (e.g., coinciding with the locations of force sensing pixels) to prevent the force sensing pixels from sticking to the display 520. This may ensure that forces exerted on the input surface 501 will cause a change in the displacement of one or more force sensing pixels relative to the bottom surface of the display 520, thus creating a measurable change in capacitive coupling between a corresponding pair of electrodes.

Figure 6:
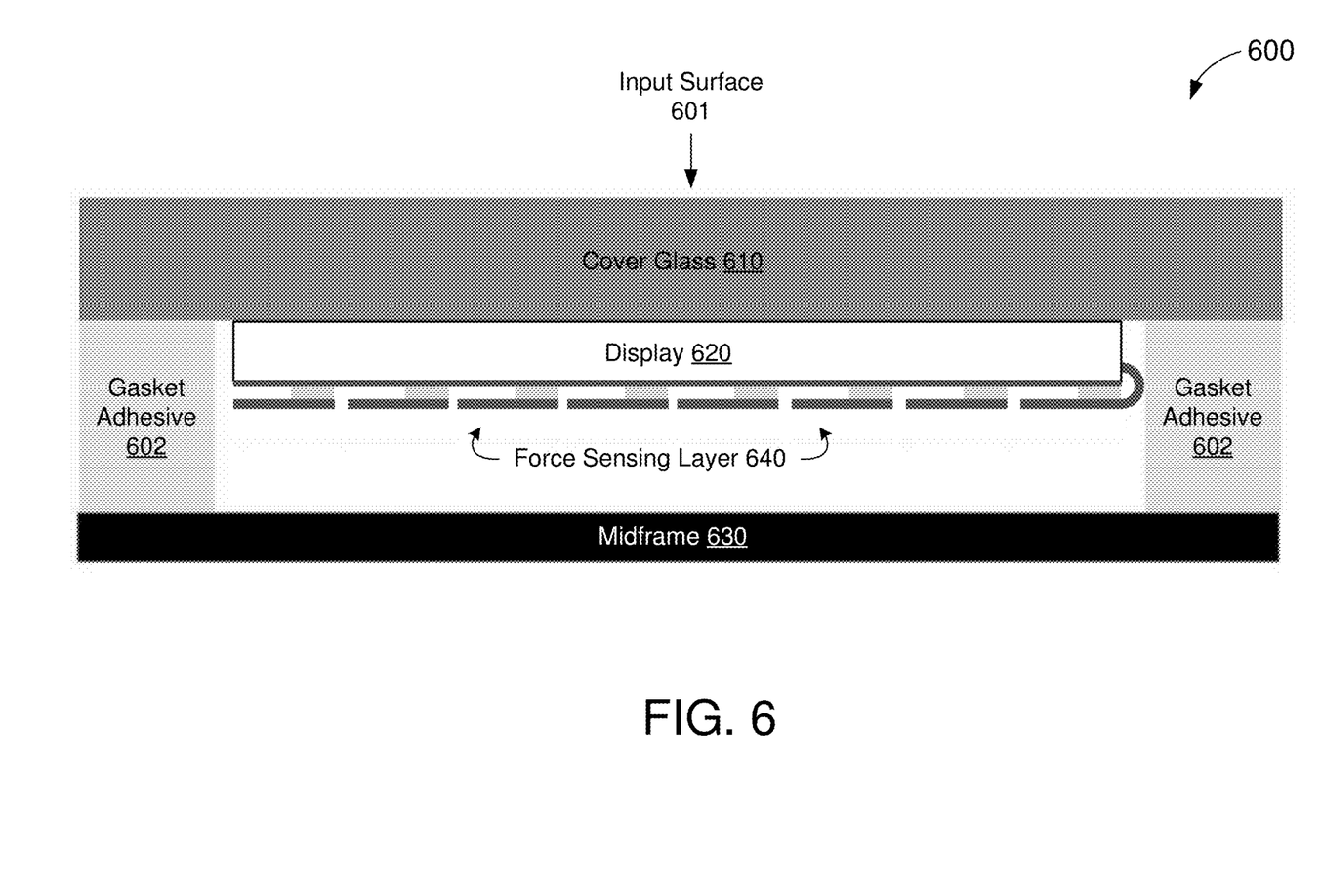
FIG. 6 shows a cross-sectional view of an input device with self-referenced force sensing capabilities, in accordance with some other embodiments.

FIG. 6 shows a cross-sectional view of an input device 600 with self-referenced force sensing capabilities, in accordance with some embodiments. The input device 600 may be an example embodiment of the input device 100 of FIG. 1. The input device 600 includes a cover glass 610, a display 620, a midframe 630, and a force sensing layer 640. In some embodiments, the cover glass 610 may be mounted to the midframe via a gasket adhesive 602. At least part of the cover glass 610 and/or display 620 may provide an input surface 601 for the input device 600.

The force sensing layer 640 may be an example embodiment of the self-referenced force sensor 200 described above with respect to FIG. 2. In the example of FIG. 6, the upper portion of the force sensing layer 640 is shown to be integrated with the display 620 (e.g., as described with respect to FIG. 5). However, in other embodiments, the upper portion of the force sensing layer 640 may be coupled to the underside of the display 620 (e.g., as described with respect to FIG. 4). Further, in the example of FIG. 6, the lower portion of the force sensing layer 640 may comprise a cable or interconnect (e.g., FPC or other type of flexible/flat cable) used to connect various components of the input device 600 (such as the display 620, touch sensor, and the like) and/or the electronic system (such as a motherboard). For example, portions of the cable may be cut out to form the force sensing pixels of the force sensing layer 640 (e.g., the cut-outs shown in FIG. 3). In some embodiments, forces applied to the input surface 601 may cause force sensing pixels in the force sensing layer 640 to deflect, resulting in a change in capacitance between electrode pairs in the force sensing layer 600 which can be measured and/or correlated with force information about the input force.

As described above, electrostatic forces may cause the force sensing pixels to stick to the bottom surface of the display 620 (or to the upper layer of the force sensing layer 640), thus preventing the movement/deflection of the pixels when a force is exerted on the input surface 601. Thus, in some embodiments, spacer dots may be printed on the bottom surface of the display 620 (e.g., coinciding with the locations of force sensing pixels) to prevent the force sensing pixels from sticking to the display 620. This may ensure that forces exerted on the input surface 601 will cause a change in the displacement of one or more force sensing pixels relative to the bottom surface of the display 620, thus creating a measurable change in capacitive coupling between a corresponding pair of electrodes.

Figure 7:
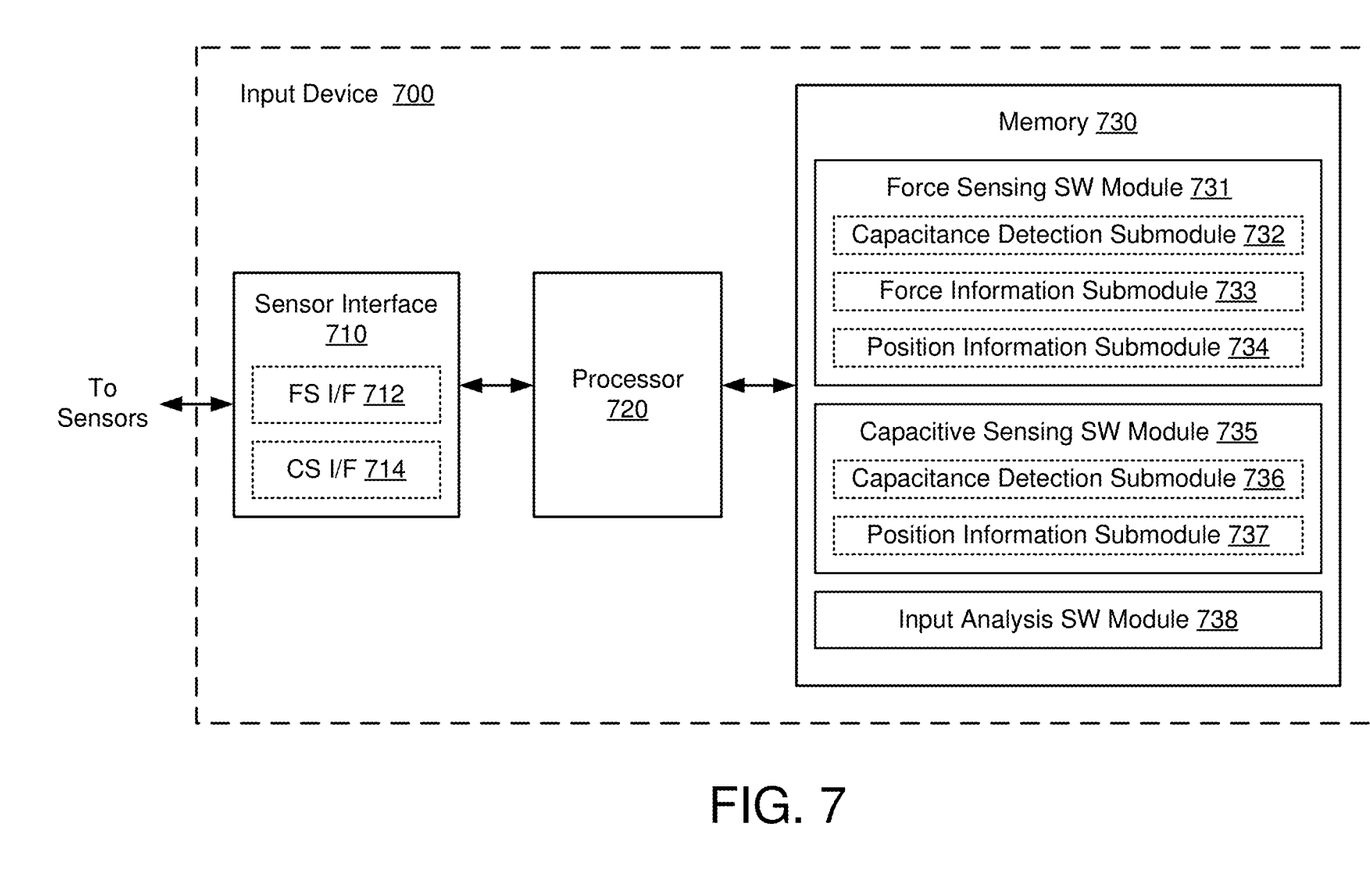
FIG. 7 shows a block diagram of an input device capable of operating a self-referenced force sensor, in accordance with some embodiments.

FIG. 7 shows a block diagram of an input device 700 capable of operating a self-referenced force sensor, in accordance with some embodiments. The input device 700 may be an example embodiment of the input devices 100 depicted in FIG. 1. In some embodiments, the input device 700 may include a sensor interface 710, a processor 720, and a memory 730.

The sensor interface 710 may be coupled to a plurality of electrodes configured for force sensing (such as electrodes 212 and 222 of FIG. 2) and a plurality of capacitive sensing electrodes (e.g., for touch and/or proximity sensing). The sensor interface 710 may include a force sensing (FS) interface (I/F) 712 and a capacitive sensing (CS) interface 714. For example, the force sensing interface 712 may transmit signals to, and receive resulting signals from, one or more force sensing electrodes. Similarly, the capacitive sensing interface 714 may transmit signals to, and receive resulting signal from, one or more capacitive sensing electrodes. In some embodiments, the sensor interface 710 may be coupled to additional sensor circuitry (such as sensor electrodes configured for touch sensing).

The memory 730 may include a non-transitory computer-readable medium (e.g., one or more nonvolatile memory elements, such as EPROM, EEPROM, Flash memory, a hard drive, etc.) that may store at least the following software (SW) modules:

a force sensing SW module 731 to detect one or more input forces exerted on an input surface of the input device 700, the force sensing SW module 731 including:

a capacitance detection submodule 732 to measure a capacitive coupling (and/or change in capacitive coupling) between two or more force sensing electrodes;

a force information submodule 733 to determine force information about the input force (such as an amount of pressure exerted by an input object) based on the measure capacitive coupling; and     a position information submodule 734 to determine position information about the input force (such as a location, on the input surface, at which the input force is detected) based on the capacitive coupling of the force sensing electrodes;

a capacitive sensing SW module 735 to detect one or more input objects in contact with, or proximate to, the input surface of the input device 700, the capacitive sensing SW module 735 including:
  a capacitance detection submodule 736 to measure a capacitive coupling (and/or change in capacitive coupling) between two or more capacitive sensing electrodes; and
  a position information submodule 737 to determine position information about the input objects based on the capacitive coupling of the capacitive sensing electrodes; and
an input analysis SW module 738 to process user inputs based, at least in part, on a combination of force sensing information from the force sensing SW module 731 and capacitive sensing information from the capacitive sensing SW module 735.

Each software module includes instructions that, when executed by the processor 720, cause the input device 700 to perform the corresponding functions. The non-transitory computer-readable medium of memory 730 thus includes instructions for performing all or a portion of the operations described below with respect to FIG. 8.

Processor 720 may be any suitable one or more processors capable of executing scripts or instructions of one or more software programs stored in the input device 700 (e.g., within memory 730). For example, the processor 720 may execute the force sensing SW module 731 to detect one or more input forces exerted on an input surface of the input device 700. In executing the force sensing SW module 731, the processor 720 may further execute at least one of the capacitance detection submodule 732, the force information submodule 733, and/or the position information submodule 734.

The processor 720 may execute the capacitance detection submodule 732 to measure a capacitive coupling (and/or change in capacitive coupling) between two or more force sensing electrodes. Further, the processor 720 may execute the force information submodule 733 to determine force information about the input force based on the measure capacitive coupling. Still further, the processor 720 may execute the position information submodule 734 to determine position information about the input force based on the measured capacitive coupling.

The processor 720 may also execute the capacitive sensing SW module 735 to detect one or more input objects in contact with, or proximate to, the input surface of the input device 700. In executing the capacitive sensing SW module 735, the processor 720 may further execute the capacitance detection submodule 736 and/or the position information submodule 737. For example, the processor 720 may execute the capacitance detection submodule 736 to measure a capacitive coupling (and/or change in capacitive coupling) between two or more capacitive sensing electrodes. Further, the processor 720 may execute the position information submodule 737 to determine position information about the input objects based on the capacitive coupling of the capacitive sensing electrodes.

Still further, in some embodiments, the processor 720 may execute the input analysis SW module 738 to process user inputs based, at least in part, on a combination of force sensing information from the force sensing SW module 731 and capacitive sensing information from the capacitive sensing SW module 735. For example, in some aspects, the input analysis SW module 738 may correlate the force information detected using the force sensing electrodes with position information detected using the capacitive sensing electrodes to determine the position or location of the input force. In some other aspects, the input analysis SW module 738 may match the position information detected using the force sensing electrodes with corresponding position information detected using the capacitive sensing electrodes to associate an input force with each input object detected in the input surface.

In a particular example, the capacitive sensing SW module 735 may detect multiple user's fingers in contact with the input surface. The force sensing SW module 731 may detect an amount of force exerted by each of the user's fingers on the input surface. The input analysis submodule 738 may correlate the location of the user's fingers with the detected forces, by correlating the position information from the force sensing electrodes with the position information from the capacitive sensing electrodes, to determine how much force is exerted by each of the user's fingers.

Figure 8:
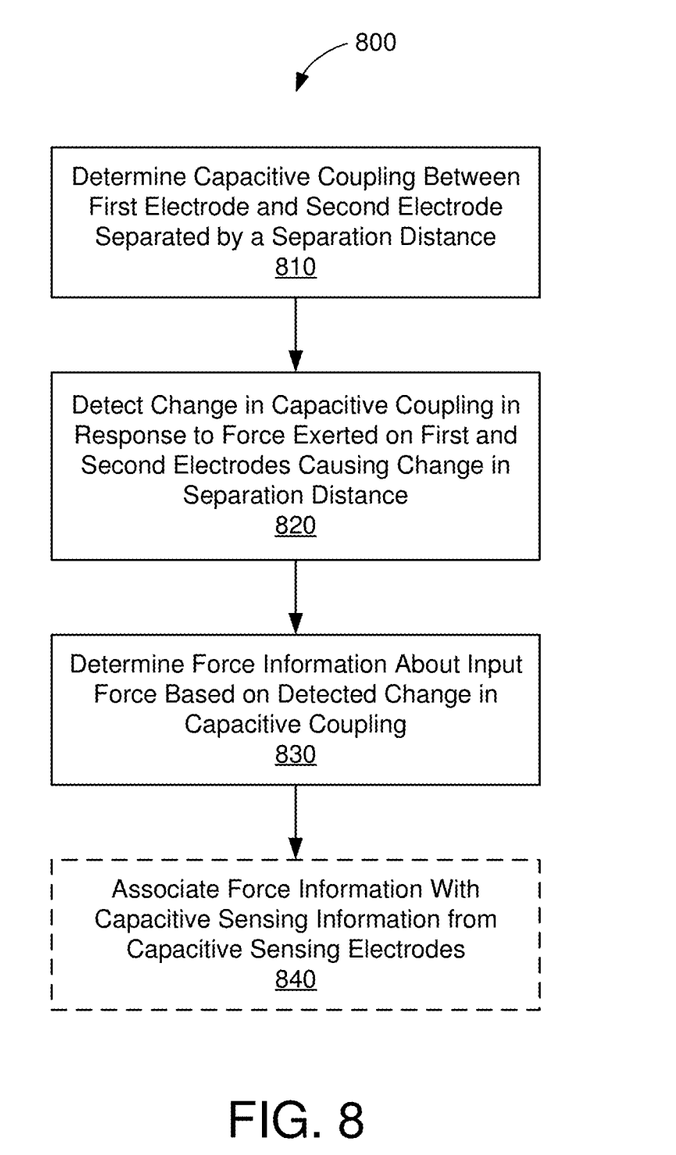
FIG. 8 shows an illustrative flowchart depicting an example operation of a self-referenced force sensor, in accordance with some embodiments.

FIG. 8 shows an illustrative flowchart depicting an example operation 800 of a self-referenced force sensor, in accordance with some embodiments. With reference for example to FIGS. 2A-2C, the operation 800 may be performed by the self-referenced for sensor 200 and/or a processing system coupled to the self-referenced force sensor 200 (such as the input device 700 of FIG. 7).

The force sensor 200 may determine a capacitive coupling between a first electrode and a second electrode separated by a separation distance (810). For example, the first electrode may correspond to the electrode 212 disposed on the upper layer 210 of the self-reference force sensor 200, and the second electrode may correspond to the electrode 222 disposed on the lower layer 220 of the self-referenced force sensor 200. In some embodiments, the spacer layer 230 may maintain a threshold (or minimum) separation distance between the electrodes 212 and 214 when the force sensor 200 is in a quiescent state (e.g., when no external forces are applied to an input surface associated with the force sensor 200). In some aspects, a processing system coupled to or otherwise associated with the force sensor 200 may measure the capacitive coupling between the electrodes 212 and 214 using transcapacitance sensing techniques. In other aspects, the processing system may measure the capacitive coupling between the electrodes 212 and 214 using absolute capacitance sensing techniques.

The force sensor 200 may detect a change in the capacitive coupling in response to a force exerted on the first and second electrodes, causing a change in the separation distance (820). For example, the input force may cause the upper and lower layers 210 and 220 of the self-referenced force sensor 200 to move (e.g., bend). However, the spacer layer 230 may transfer the force to the force sensing pixels in a manner that allows the force sensing pixels to remain tangent to the deflect lower layer 220, resulting in a deflection of one or more of the electrodes 222 relative to the electrodes 212. The degree of deflection causes a corresponding change in the separation distance (Δd) between the corresponding electrodes 212 and 222. Thus, while the input force may cause a displacement or movement in a pair of electrodes used for force sensing (e.g., including the transmitter electrode and the receiver electrode), the configuration of the self-referenced force sensor 200 ensures that the movement of one of the electrodes is different than the movement of the other electrode so that a relative change in the separation distance between the electrodes can be detected.

The force sensor 200 may then determine force information about the input force based on the detected change in capacitive coupling (830). For example, as the amount of force exerted on the input surface increases, the separation distance between the electrodes 212 and 222 may also increase (or decrease, depending on the location of the applied force). The increase (or decrease) in separation distance may result in a corresponding a decrease (or increase) in the measured capacitance across the electrodes 212 and 222. A processing system coupled to or otherwise associated with the force sensor 200 may correlated the change in capacitance with an amount of force exerted on the input surface. In some embodiments, the processing system may further determine position information about the input force based on a relative location of the electrodes 212 and 222 for which the change in capacitive coupling is detected.

In some embodiments, the force sensor 200 may further associate the force information with capacitive sensing information from a plurality of capacitive sensing electrodes (840). For example, in some aspects, the force sensor 200 may correlate the force information detecting using the force sensing electrodes with position information detected using the capacitive sensing electrodes to determine the position or location of the input force. In some other aspects, the force sensor 200 may determine the position of the input force based on the force sensing electrodes themselves (e.g., based on the position of the actuated electrodes and the detected change in capacitive coupling). Still further, in some embodiments, the force sensor 200 may match the position information detected using the force sensing electrodes with corresponding position information detected using the capacitive sensing electrodes to associate an input force with each input object detected in the input surface (e.g., as described above with respect to FIG. 7).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A force sensing apparatus comprising:
    a first layer including a first electrode disposed thereon;
    a second layer including a second electrode disposed thereon, wherein the second electrode is separated from the first electrode by a separation distance, and wherein the second layer is partitioned into a plurality of sections;
    a spacer layer configured to transfer an input force exerted on the first layer to the second layer by causing an increase in the separation distance between the first electrode and the second electrode at a location of the input force, as the input force increases, wherein the spacer layer includes a plurality of spacer members each attached to a respective section of the second layer; and
    processing circuitry configured to:
        detect a change in capacitive coupling between the first electrode and the second electrode based on the increase in the separation distance; and
        determine force information about the input force based at least in part on the detected change in capacitive coupling.

2. The force sensing apparatus of claim 1, wherein the input force causes a displacement of the first electrode and the second electrode.

3. The force sensing apparatus of claim 1, wherein the spacer layer is configured to cause a deflection of the second electrode relative to the first electrode in response to the input force.

4. The force sensing apparatus of claim 3, wherein the deflection causes the increase in the separation distance between the first electrode and the second electrode.

5. The force sensing apparatus of claim 1, wherein the spacer layer is configured to maintain a threshold separation distance between the first layer and the second layer when no external forces are applied to the first layer.

6. The force sensing apparatus of claim 1, wherein each of the plurality of sections includes a respective electrode disposed thereon.

7. The force sensing apparatus of claim 6, wherein the spacer layer is configured to transfer the input force to one or more of the plurality of sections by causing a deflection of the one or more sections relative to the first layer.

8. The force sensing apparatus of claim 7, wherein the processing circuitry is further configured to:
    determine position information about the input force based at least in part on a relative location of the one or more sections in the second layer.

9. An input device, comprising:
    an input surface;
    a first electrode coupled to the input surface;
    a force sensing layer including at least a second electrode separated from the first electrode by a separation distance, wherein at least a portion of the force sensing layer is partitioned into a plurality of sections;
    a spacer layer configured to transfer an input force exerted on the input surface to the first and second electrodes by increasing the separation distance between the first electrode and the second electrode at a location of the input force, as the input force increases, wherein the spacer layer includes a plurality of spacer members each attached to a respective section of the second layer; and processing circuitry configured to:
  detect a change in capacitive coupling between the first electrode and the second electrode based on the increase in the separation distance; and
  determine force information about the input force based at least in part on the detected change in capacitive coupling.

10. The input device of claim 9, wherein the input force causes a displacement of the first electrode and the second electrode.

11. The input device of claim 9, wherein the spacer layer is configured to cause a deflection of the second electrode relative to the first electrode in response to the input force.

12. The input device of claim 11, wherein the deflection causes the increase in the separation distance between the first electrode and the second electrode.

13. The input device of claim 9, wherein the input surface comprises a top surface of a display.

14. The input device of claim 13, wherein the first electrode is disposed on one or more layers of the display.

15. The input device of claim 13, wherein the second electrode is disposed, at least in part, on an interconnect coupled to one or more components of the input device.

16. A method, comprising:
  determining a capacitive coupling between a first electrode disposed on a first layer and a second electrode disposed on a second layer, wherein the first electrode and the second electrode are separated by a separation distance, wherein the second layer is partitioned into a plurality of sections each attached to a respective member of a plurality of spacer members included in a spacer layer;
  detecting an increase in the separation distance at a location of an input force exerted on the first layer and transferred to the second layer, wherein the separation distance increases as the input force increases;
  detecting a change in the capacitive coupling based on the increase in the separation distance; and
  determining force information about the input force based at least in part on the detected change in the capacitive coupling.

17. The method of claim 16, wherein the input force causes a displacement of the first electrode and the second electrode.

18. The method of claim 16, wherein the second electrode is configured to deflect relative to the first electrode in response to the input force, and wherein the deflection causes the increase in the separation distance between the first electrode and the second electrode.

19. The method of claim 16, wherein each of the plurality of sections has a respective electrode disposed thereon.

20. The method of claim 19, wherein the spacer layer is configured to transfer the input force to one or more of the plurality of sections by causing a deflection of the one or more sections relative to the first layer, the method further comprising:
  determining position information about the input force based at least in part on a relative location of the one or more sections in the second layer.

* * * * *